H. H. PETERSON.
BINDER TRUCK.
APPLICATION FILED MAR. 29, 1920.
1,360,975.
Patented Nov. 30, 1920.
3 SHEETS—SHEET 1.
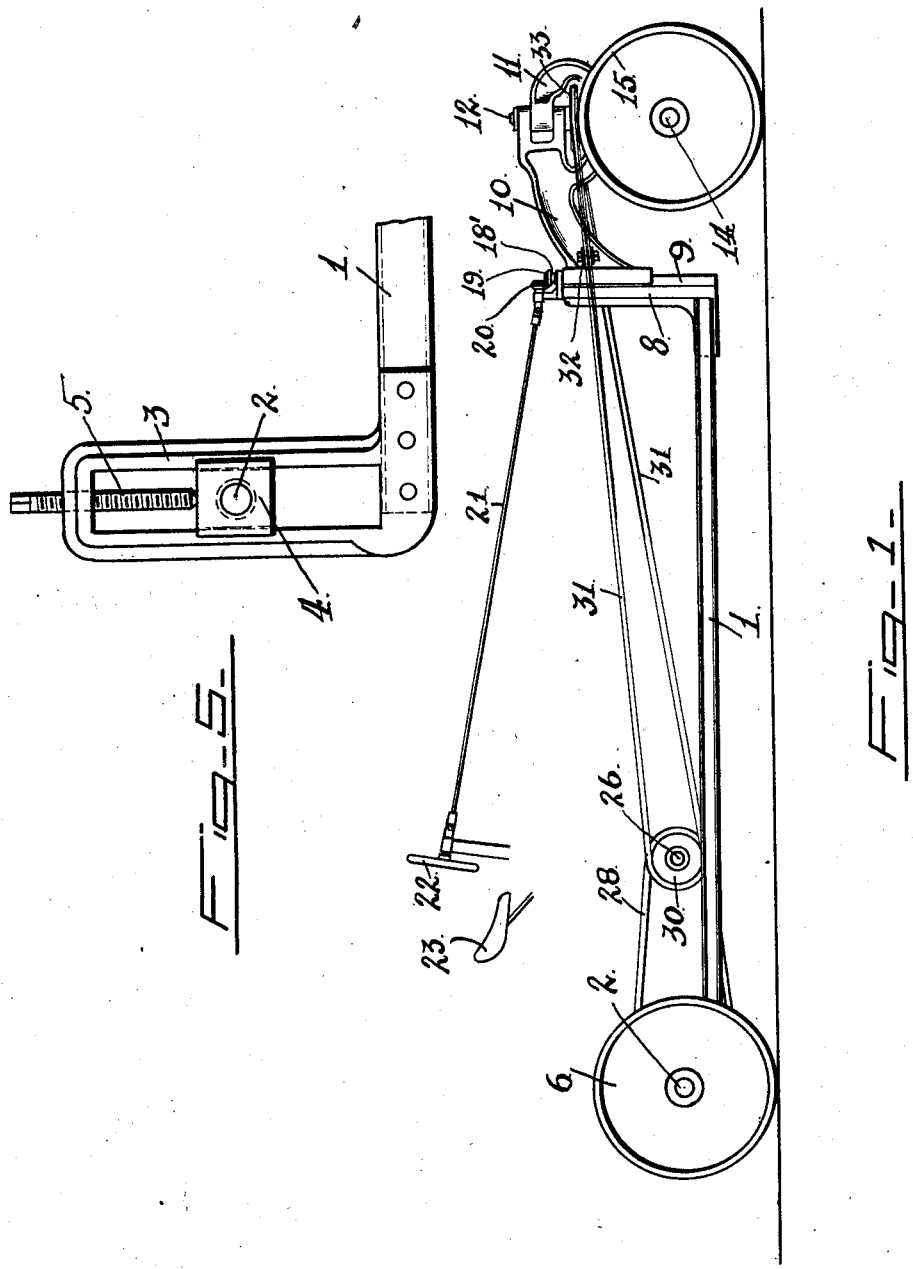
WITNESS
INVENTOR
Harry H. Peterson
BY
Booth & Booth
ATTORNEYS

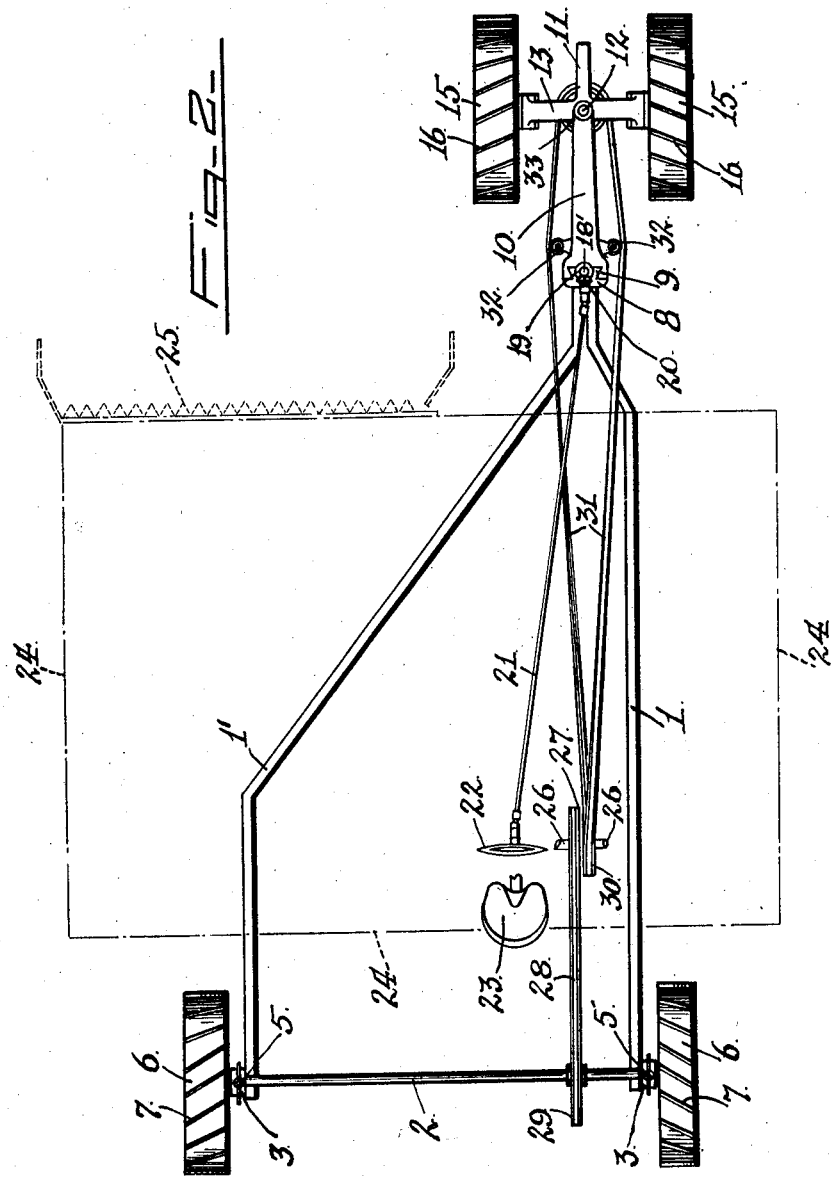

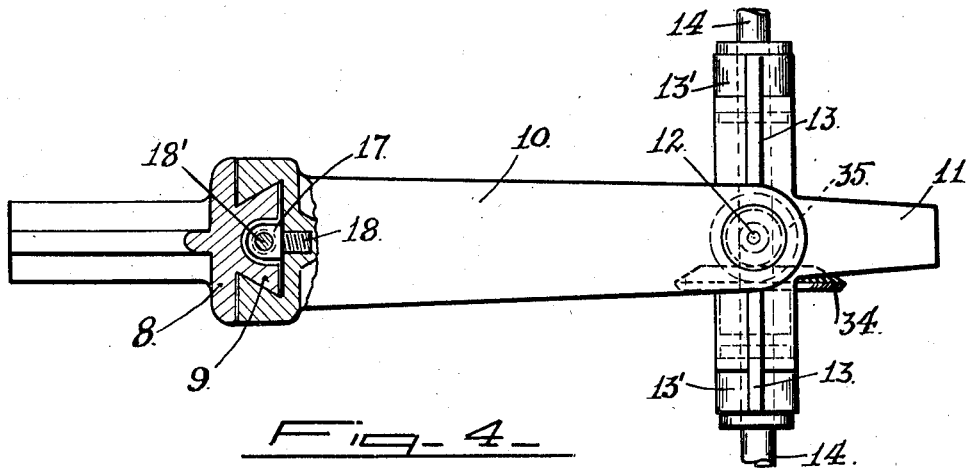
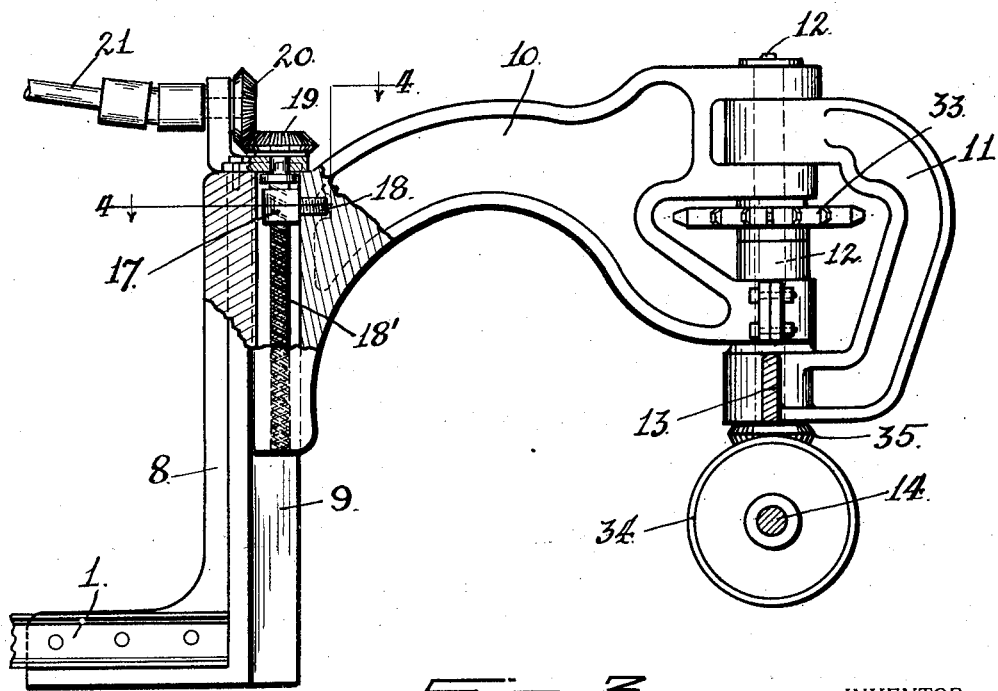

UNITED STATES PATENT OFFICE.

HARRY H. PETERSON, OF RICHVALE, CALIFORNIA.

BINDER-TRUCK.

1,360,975.                Specification of Letters Patent.        Patented Nov. 30, 1920.

Application filed March 29, 1920. Serial No. 369,477.

*To all whom it may concern:*

Be it known that I, HARRY H. PETERSON, a citizen of the United States, residing at Richvale, in the county of Butte and State of California, have invented certain new and useful Improvements in Binder-Trucks, of which the following is a specification.

My invention relates in general to that class of agricultural implements especially used in the harvesting of rice and commonly known as rice-binders.

My invention relates particularly to the carrying or supporting feature of the implement, which supporting feature may properly be termed the truck; and it is in the novel construction of the truck that my invention consists, and not in the general operative mechanisms by which the binder performs its functions.

Implements of this class are commonly supported upon a main wheel, located well under and bearing the greater portion of the weight of the machine, a small side wheel being used for balancing purposes. The operative mechanisms of the implement are driven by traction from the main supporting wheel and the machine is consequently dependent for its operativeness upon the proper running of this wheel.

As these implements, from the nature of the crop which they harvest, are used in very muddy ground, serious trouble and much delay are experienced from the clogging up with mud of the traction wheel, a result due to several factors; for example, the fact that it is the sole traction member, and the chief supporting member; its relatively inaccessible location, which requires difficult, muddy, insanitary, and generally unwilling labor to get at it and clean it; the frequency with which it clogs up and requires attention; the disturbance of neighboring parts of the machine by the mud thrown upon them by said wheel and by the small side wheel; and finally the stoppage of the machine and useful work by the refusal of the mud-clogged wheel to perform its function of traction.

Moreover, this common arrangement of the traveling support of these machines results in such pronounced side-draft, as to weary the draft animals, and this is all the more in effect when the nature of the ground in which they work is considered.

It is the object of my invention to overcome these difficulties by providing a traveling support in the nature of a truck for binders especially, though not solely, adapted for rice binders, in which four wheels are used, each of which is a traction wheel thereby distributing the load and work, said wheels being disposed so far exterior to the operative parts of the machine that they are less liable to clog up, and when they do, gather mud, may be readily reached for cleaning; and in which by the relative disposition of the wheels and the shape of the frame they carry, the whole implement is well balanced and side-draft avoided.

With these ends in view, my invention consists in the novel binder-truck which I shall hereinafter fully describe by reference to the accompanying drawings, in which—

Figure 1 is a side elevation of my binder-truck.

Fig. 2 is a plan of the same.

Fig. 3 is a side-elevation, partly broken in section, and enlarged, of the front of the truck, showing the means for vertically adjusting the front of the truck frame.

Fig. 4 is a plan view of Fig. 3, partly in section on the line 4—4 of Fig. 3, the sprocket 33 being omitted.

Fig. 5 is an enlarged detail showing the means for vertically adjusting the rear portion of the truck.

The frame of the truck, as shown in Fig. 2, comprises two side members 1 and 1', the forward portion of the latter being so bent as to converge forwardly toward the other member, thereby forming a frame, the apex of which is at the front, and to one side of the longitudinal axis of the frame, and the base of which is at the rear and is relatively wide.

At the rear of the frame is the rear axle 2, which is mounted for rotation on its axis, and is carried in such manner that the frame may, at its rear portion be vertically adjusted. This is shown fully in Fig. 5, the mounting of the axle and the adjustment of the frame comprising a vertical guide bracket 3 secured to and rising from the rear end of the side frame-members 1 and 1'; a bearing block 4 fitted to and slidable in each guide bracket, and in which blocks the rear axle 2 is journaled; and an adjusting screw 5 associated with each of said brackets and bearing blocks. Fitted to the ends of the rear axle 2, outside the frame members 1 and 1', are the rear wheels 6.

These are traction wheels, as indicated by the cleats 7. The mounting of these wheels on the axle is such as to impart by their traction, rotation to the axle 2, as, for example, by the usual pawl and ratchet connection unnecessary to show, and which enables the frame to turn without slipping the wheels. To the forward end or apex of the frame is secured an uprising bracket 8, the front of which has a dovetail guide 9 upon which is slidably fitted the rear portion of the arched or goose-neck yoke-member 10, Figs. 3 and 4. The forward end of the member 10, together with the draft-clevis member 11, are pivotally assembled upon a vertical king-bolt spindle 12. The draft-clevis 11 is formed with a cross web 13, which turning downward carries suitable bearings 13', Fig. 4, in which is journaled for rotation the front axle 14, which carries the front wheels 15, each of which is a traction wheel, as shown by the cleats 16, and each is so mounted on the axle as to impart rotation thereto.

The front of the frame by its sliding dove-tail fitting on the arched yoke member 10, is adapted for vertical adjustment, this being effected as shown in Fig. 3, by means of a nut 17 secured by its threaded stem 18 in the arched yoke member 10, and the screw 18' associated with said nut and fitted in the vertical front bracket 8 of the frame.

The screw 18' is operated by a bevel gear 19 on its upper end, with which engages a bevel gear 20 on the forward end of a turn-rod 21, which, as shown in Figs. 1 and 2, extends rearwardly to a hand wheel 22 within reach of the operator on the seat 23.

In Fig. 2, I have indicated by dotted lines the diagrammatic outline of the body 24 of the binder and the sickle 25. As before stated my invention has no concern with the details of the binder, and it is therefore, sufficient to make the diagrammatic showing here given, in order to illustrate its position on the truck, thus showing the general well balanced support condition thereof, due to the shape of the truck frame, and especially the position of the truck wheels with relation to the binder body, said wheels being well outside of and removed from said body, so that they are readily accessible, and are not liable to clog up, nor to interfere in any way with the operation of the machine.

My invention contemplates, as before stated, the utilization of all the wheels as drivers for the mechanism of the binder. To illustrate this feature, I have shown in Figs. 1 and 2, the main drive shaft 26 of the binder mechanism. Upon this shaft is a sprocket 27 from which a driving connection 28 extends to a sprocket 29 on the rear axle 2. Thus motion is transmitted from the rear axle. Upon the shaft 26 is a second sprocket 30 from which a crossed-driving connection 31 extends past guide sheaves 32 to a sprocket 33 shown in Fig. 3 on the king-bolt spindle 12. Upon the front axle 14, Figs. 3 and 4, is a bevel gear 34 which engages with a bevel gear 35 on the king-bolt spindle 12. Thus motion is transmitted from the front axle.

By the rear and front adjustments of the truck frame the general clearance thereof is provided for, and by the adjustment of the front, the variation in height of the sickle cut is effected. As indicated by the position of the binder body on the truck, it is apparent that it is well balanced and that side draft is practically eliminated.

I claim:—

1. A binder truck comprising a frame having its forward end disposed to one side of its longitudinal axis; a rotatably mounted front axle at the forward end of the frame; traction wheels carried by and adapted to rotate said front axle, said wheels lying to one side of the longitudinal axis of the frame; a rotatably mounted rear axle at the rear end of the frame; traction wheels carried by and adapted to rotate said axle, said wheels being disposed one on each side of longitudinal axis of the frame; and power transmitting connections from each axle to operate the mechanisms of the binder carried by the frame.

2. A binder truck comprising a frame having its forward end disposed to one side of its longitudinal axis; a rotatably mounted front axle at the forward end of the frame; traction wheels carried by and adapted to rotate said front axle, said wheels lying to one side of the longitudinal axis of the frame; a rotatably mounted rear axle at the rear end of the frame; traction wheels carried by and adapted to rotate said axle, said wheels being disposed one on each side of longitudinal axis of the frame; power transmitting connections from each axle to operate the mechanisms of the binder carried by the frame; and means for independently vertically adjusting each end of said frame with relation to the ground.

3. A binder truck comprising a frame having its forward end disposed to one side of its longitudinal axis; an arched yoke member at the forward end of the frame; a vertically slidable connection between said arched yoke member and said forward end of the frame; means for operating said slidable connection to adjust the height of the forward end of the frame with relation to the ground; a rotatably mounted front axle pivotally carried at the forward end of said arched member; traction wheels carried by and adapted to rotate said front axle, said wheels lying to one side of the longitudinal axis of the frame; a rotatably mounted rear axle at the rear end of the frame; traction wheels carried by and adapted to rotate said rear axle, said wheels being disposed one on each side of the longitudinal axis of the frame; and power transmitting connections from each axle to operate the mechanisms of the binder carried by the frame.

4. A binder truck comprising a frame having its forward end disposed to one side of its longitudinal axis; an arched yoke member at the forward end of the frame; a vertically slidable connection between said arched yoke member and said forward end of the frame; means for operating said slidable connection to adjust the height of the forward end of the frame with relation to the ground; a rotatably mounted front axle pivotally carried at the forward end of said arched member; traction wheels carried by and adapted to rotate said front axle, said wheels lying to one side of the longitudinal axis of the frame; vertical guide brackets secured to each side of the rear end of the frame; bearing blocks slidably mounted in said brackets; a rear axle rotatably mounted in said blocks; screws for vertically adjusting the rear end of the frame on said blocks; traction wheels carried by and adapted to rotate said rear axle, said wheels being disposed one on each side of the longitudinal axis of the frame; and power transmitting connections from each axle to operate the mechanisms of the binder carried by the frame.

5. In a binder truck, the combination of a frame; a wheel support for the rear end of the frame; a vertical bracket secured to the forward end of the frame, said bracket having a dove-tail slide on its front; an arched yoke member having its rear end slidably fitted on said dove-tail slide; a nut carried by the rear end of the arched yoke member; a screw carried by the vertical member of the frame and threaded through the nut; means for operating the screw to relatively adjust the frame and yoke member; and supporting wheels pivotally carried by the forward end of the yoke member.

6. In a binder truck, the combination of a frame; a wheel-support for the rear end of the frame; a vertical bracket secured to the forward end of the frame, said bracket having a dove-tail slide on its front; an arched yoke member having its rear end slidably fitted on said dove-tail slide; a nut carried by the rear end of the arched yoke member; a screw carried by the vertical member of the frame and threaded through the nut; means for operating the screw to relatively adjust the frame and yoke member; a rotatable spindle carried by the forward end of the yoke member; a draft-member pivotally associated with said yoke member and spindle; an axle rotatably mounted in said draft-member; traction wheels carried by and adapted to rotate said axle; means for transmitting motion from the axle to the spindle; and means for transmitting motion from the spindle to operate the binder mechanisms.

7. In a binder truck, the combination of a frame; a wheel-support for the forward end of the frame; vertical brackets secured to the rear end of the frame; bearing blocks slidably mounted in said brackets; screws for relatively vertically adjusting said brackets and blocks; a rear axle rotatably mounted in said bearing blocks; traction wheels on said axle adapted to rotate it; and means for transmitting motion from said axle to operate the mechanisms of the binder carried by the frame.

In testimony whereof I have signed my name to this specification.

HARRY H. PETERSON.